United States Patent [19]
Williams

[11] Patent Number: 5,931,187
[45] Date of Patent: Aug. 3, 1999

[54] VALVE SYSTEM FOR RESTARTING OSCILLATING CONTROLLER

[75] Inventor: James F. Williams, Valencia, Calif.

[73] Assignee: Williams Instrument Incorporated, Valencia, Calif.

[21] Appl. No.: 09/048,709

[22] Filed: Mar. 26, 1998

[51] Int. Cl.[6] .................................................. F16K 31/02
[52] U.S. Cl. ...................... 137/487.5; 137/613; 137/494; 251/297; 91/284
[58] Field of Search ................................... 137/494, 613, 137/487.5, 614.2; 251/297; 91/284

[56] References Cited

U.S. PATENT DOCUMENTS

| | | | |
|---|---|---|---|
| 795,003 | 7/1905 | Oeling | 91/284 |
| 2,276,435 | 3/1942 | Thompson | 91/284 |
| 2,733,729 | 2/1956 | Wolfe | 251/297 X |
| 3,216,329 | 11/1965 | Peterson | 91/284 |
| 3,387,563 | 6/1968 | Williams | 91/284 |
| 4,079,660 | 3/1978 | Ives | 251/297 X |
| 5,567,393 | 10/1996 | Muschelknautz et al. | 137/494 X |

*Primary Examiner*—Denise L. Ferensic
*Assistant Examiner*—Ramyar Farid
*Attorney, Agent, or Firm*—Lyon & Lyon

[57] ABSTRACT

A valve system for starting/restarting an oscillating controller of the type that uses a source of pressurized gas to provide controlled pulses of the pressurized gas to a pump, such as a chemical injector pump. The start/restart valve includes a valve element that is closed by a valve spring when the pressure of the pressurized gas source drops below a predetermined minimum and is opened upon the pressure increasing to a second predetermined pressure higher than the predetermined minimum pressure to thereby provide a higher pressure for starting or restarting the oscillating movement of the controller. The start/restart valve includes a detent mechanism for maintaining the valve element in either the open or closed position until the gas pressure reaches the appropriate pressure level for switching to the opposite position. The opening of the valve element may be caused by the gas pressure being applied directly to the valve element or indirectly through a diaphragm in alternate embodiments. In still another embodiment, the start/restart valve system includes a solenoid valve that is operated in response to a pressure sensor that determines the pressures at which a solenoid valve is opened and closed electrically.

19 Claims, 4 Drawing Sheets

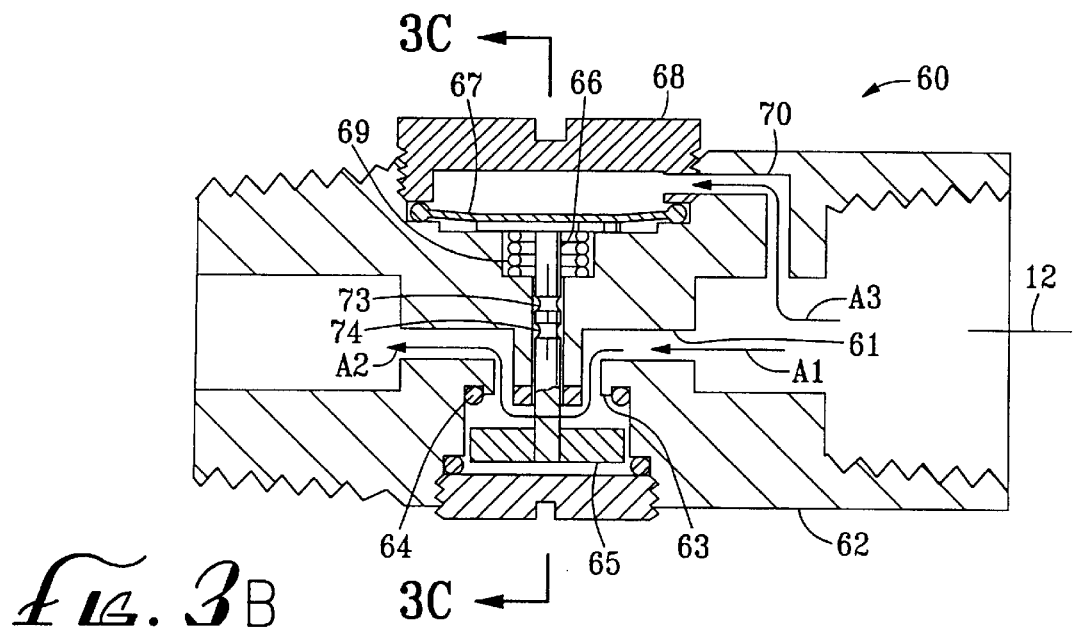
*fig. 3*B
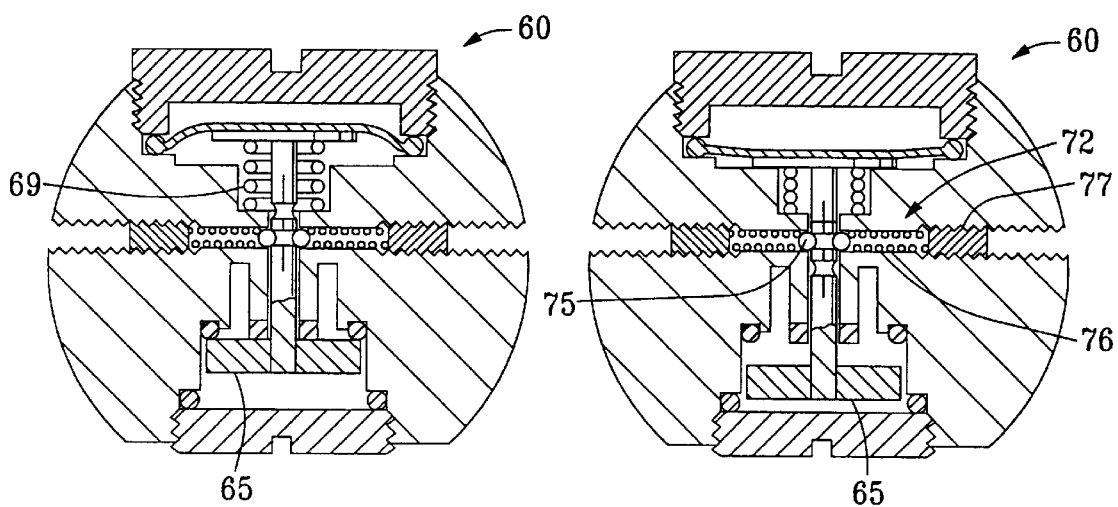
*fig. 3*A  *fig. 3*C

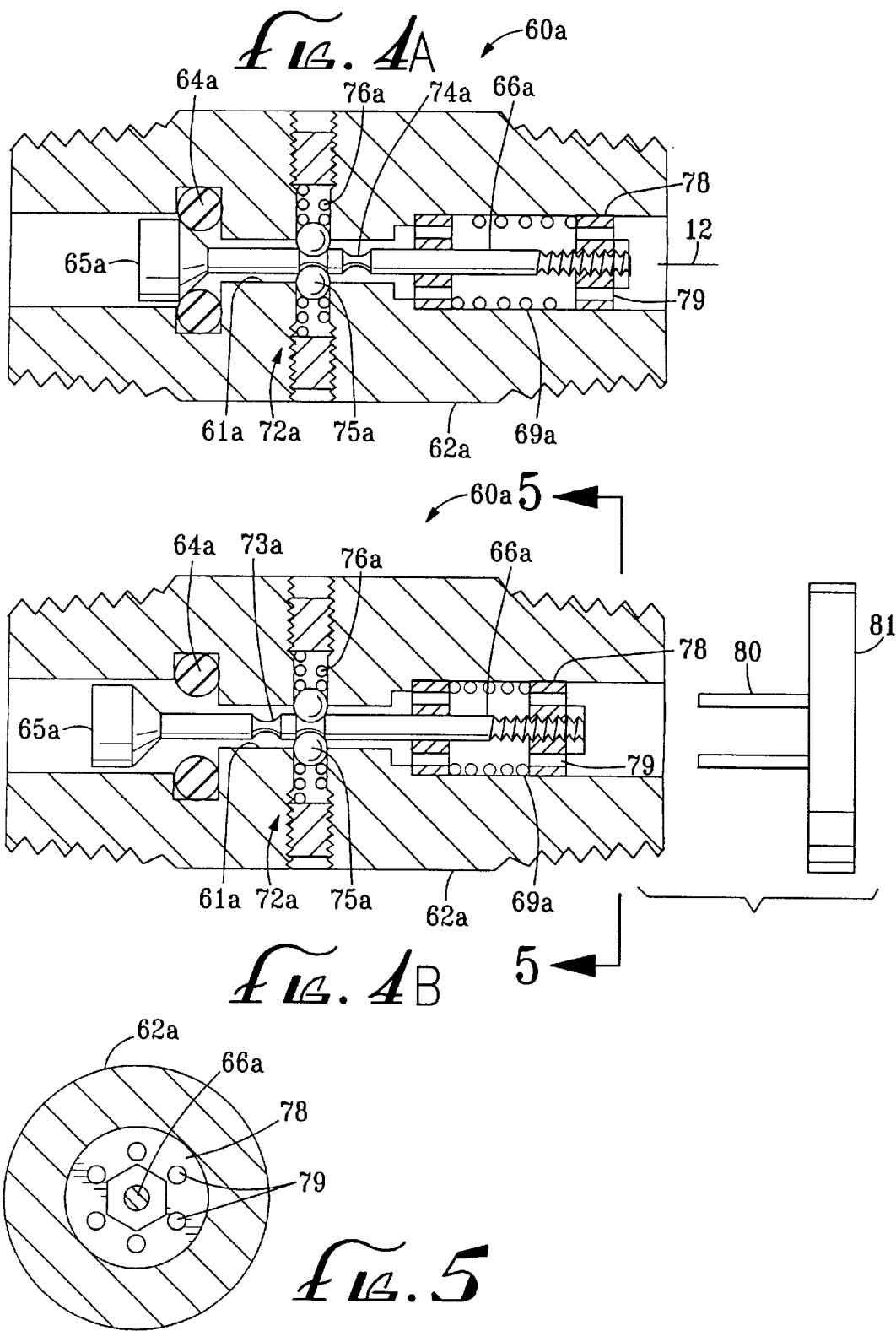

VALVE SYSTEM FOR RESTARTING OSCILLATING CONTROLLER

This invention relates to systems for automatically and precisely injecting chemicals into a stream of fluid and, in particular, relates to a valve system for automatically starting and restarting an oscillating controller that operates the chemical injection pump in such systems when the controller stops oscillating because of a drop in the operating pressure.

Chemical injectors are used in a variety of industries for injecting relatively minute quantities of a liquid chemical or the like into a fluid flow line such as, for example, chemical odorants into a natural gas line, chlorine into a water line, corrosion or scale inhibitors into a petrochemical line, and coloring into a food processing or other product line. One form of such chemical injector systems uses a pneumatically operated controller that automatically cycles (oscillates) at regular intervals for supplying gas pressure to a chemical injector pump to thereby cause the pump to inject chemicals automatically at the desired rate, as established by the controller, which rate is adjustable. One such controller is disclosed in U.S. Pat. No. 3,387,563 "Chemical Injector" and the commercial embodiment thereof is known as the Oscillamatic pneumatic oscillator pump controller ("Oscillamatic" is a registered trademark of Williams Instrument Co., Inc., the manufacturer of that controller).

Often an automatic chemical injector system of this type must use a pressurized gas source which has a variable pressure, such as a natural gas pipeline, and the chemical injection system is in a remote location that does not readily permit constant monitoring of the gas supply pressure for operating the controller. Pneumatically operated (by air or other gases) oscillating controllers of this type rely upon the differential in force created by the different areas of surfaces of diaphragms or pistons therein to which the operating gas pressure is supplied and the cyclic exhausting of those pressures to cause the oscillating movement of the controller and therefore the cyclic supply of gas pressure to the chemical injector pump. An inherent characteristic of this type of pneumatically operated oscillating controller is that if the pressure of the operating gas supply drops below a minimum amount, such as by reason of the fluctuation in the pressure in a natural gas pipeline, the oscillating controller may stop oscillating in the closed position and will not restart oscillating merely by reason of the supply pressure thereafter increasing to a normally acceptable level. Similarly, when the controller of this type is first installed and pressure is applied, the controller may not automatically start oscillating. In both instances, i.e. after an excessive drop in supply pressure and in initial start up, if the controller dos not start oscillating, an operator must manually shut off the gas supply and allow the pressure within the controller to drop to zero through the exhaust port, and then manually open the supply pressure when it is at an adequately high level to start or restart the oscillation of the controller. The low pressure at which the oscillating controller stops oscillating depends on the design pressure of that controller, such as 20 psi for a design pressure range of 20–50 psi and 30 psi for a design pressure range of 30–100 psi, which are typical design pressure ranges.

It is an object of this invention to provide a valve system for automatically starting or restarting an oscillating controller that is operated by pneumatic pressure when the controller fails to start or stops oscillating by reason of a low supply pressure.

It is a further object of this invention to provide an automatic start/restart valve for a pneumatically operated oscillating controller or the like wherein said start/restart valve automatically closes upon a drop in supply pressure below a predetermined amount and automatically opens when the supply pressure exceeds a second predetermined pressure higher than said first predetermined pressure. Specifically, the start/restart valve of this invention may include a valve element movable between an open position and a closed position, a pressure responsive actuating device for moving the valve element to a closed position when the supply pressure drops below the first predetermined pressure and for moving the valve element to an open position upon the supply pressure thereafter exceeding a predetermined amount. As an alternative construction, the start/restart valve may be a solenoid valve that is operated in response to a pressure sensor.

Other objects and advantages of this invention will appear from the following specification and the accompanying drawings.

BRIEF DESCRIPTION OF THE DRAWINGS

FIG. 3A is a sectional view taken on the line 3A—3A in FIG. 2 and illustrating the closed position of the start/restart valve of the present invention;

FIG. 3B is a sectional view of the restart valve of the present invention similar to the view in FIG. 2 but showing the valve in the open position;

FIG. 3C is a sectional view taken on the line 3C—3C shown in FIG. 3B;

FIG. 4A is a sectional view of a second embodiment of the restart valve of the present invention and illustrating the valve in the closed position;

FIG. 4B is a sectional view of the valve shown in FIG. 4A but showing the valve in the open position;

FIG. 5 is a sectional view taken on the line 5—5 in FIG. 4B; and

DETAILED DESCRIPTION OF THE PREFERRED EMBODIMENTS

Figure 1:
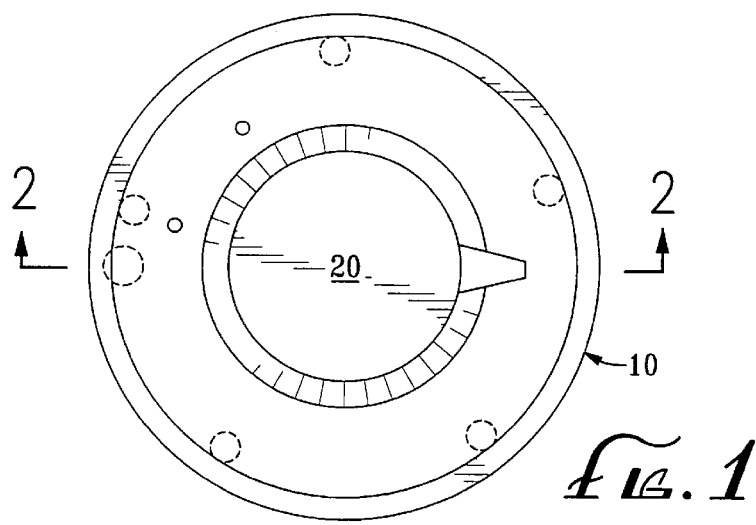
FIG. 1 is a diagrammatic top view of an oscillating controller to which the present invention is applicable.
Figure 2:
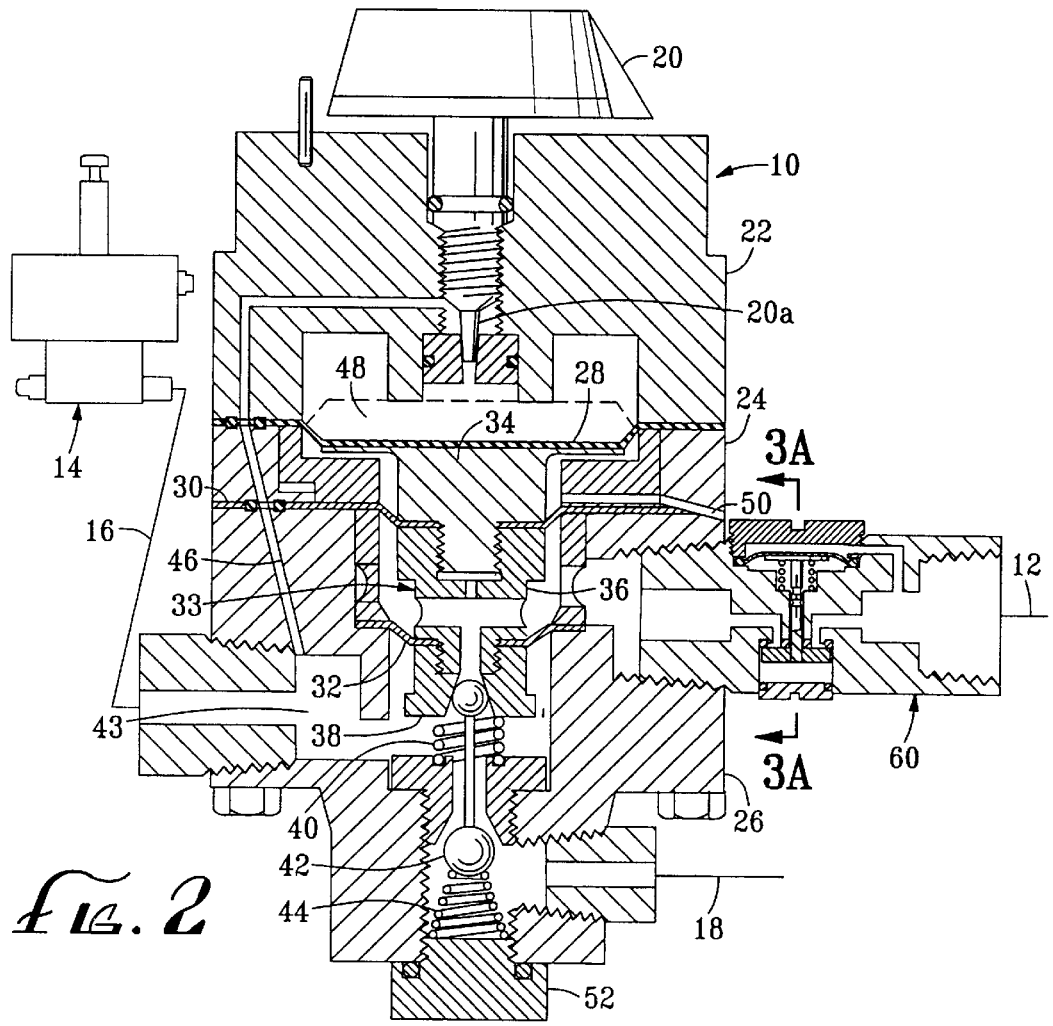
FIG. 2 is a sectional view of the oscillating controller taken on the line 2—2 in FIG. 1 and showing a first embodiment of the start/restart valve of the present invention, as well as the chemical injector pump.

Referring now to FIGS. 1 and 2, a controller 10 is diagrammatically shown and is of a generally similar construction and operation as the oscillating controller described and illustrated in the aforementioned U.S. Pat. No. 3,387,563 "Chemical Injector", with some differences that will be described hereinafter. The controller 10 is connected between a pressurized gas source 12 and a conventional injector pump 14 through a line 16. The controller 10 provides controlled pulses or cycles of pressurized gas from the source 12 through line 16 to pump 14 to cause a pumping stroke for injecting a precise quantity of a chemical or the like into a fluid flowing through a pipeline or the like to provide the desired mixture of that fluid and chemical. The controller 10 then serves to exhaust the pressurized gas from pump 14 through line 16 and an exhaust port or line 18 to allow the pump 14 to intake the desired quantity of chemical for the next pressurized stroke of pump 14, as caused by the controller 10. The rate pf cycles at which the pump 14 is operated by the controller 10 is adjustable by the knob 20 on top of the controller in a manner described below and, therefore, the rate at which the chemical is injected by the pump 14 into the pipe line is variable by adjusting the knob 20 to control the rate of cycles or oscillations of the controller 10.

A brief description of the operation of controller 10 will be provided for an understanding of the present invention but for a complete description of the construction and operation of a controller of this type, the aforementioned U.S. Pat. No. 3,387,563 is incorporated here by reference as though set forth in full. The controller 10 includes an upper body 22, an intermediate flange 24 and a lower body 26 that form internal cavities of the appropriate sizes for the gas pressures that are exposed to the cavities to cause the desired oscillating operation. An upper diaphragm 28 is provided between upper body 22 and flange 24, a snapper diaphragm 30 is provided between flange 24 and lower body 26, and a lower diaphragm 32 is provided in the lower body 26. A central valve member 33 comprising a diaphragm engaging element 34, a spacer-connector 36 and a valve seat member 38 are connected to and supported by the middle and lower diaphragms 30 and 32. The spacer-connector 36 has ports for communicating the pressurized gas from source 12 to the cavity between diaphragms 30 and 32 and to the valve member 38. Diaphragm 30 has a larger exposed area than diaphragm 32 and, therefore, the gas pressure from source 12 tends to urge the central valve member 33 upwardly. Similarly, a coil spring 40 engaging the bottom of valve member 38 urges the central valve member 33 upwardly at all times. A pilot plug 42 consisting of two balls connected by a stem is centrally positioned below the valve member 38 with the lower ball being urged into engagement with a valve seat by a spring 44 for closing the communication to the exhaust port 18. The upper ball on pilot plug 42 engages the valve member 38 to close the communication from the spacer-connector 36 to the internal chamber 43 of lower body 26 that is connected to line 16 leading to pump 14. In the position shown in FIG. 2, the gas is being exhausted from pump 14 through line 16 and chamber 43 passed the lower ball on pilot plug 42 to exhaust port 18 while pressurized gas from source 12 is filling the chamber between diaphragms 30 and 32, which pressure tends to urge the central valve member and diaphragms upwardly.

When the gas pressure has been exhausted sufficiently from pump 14 through exhaust port 18 and the pressure between diaphragms 30 and 32 becomes sufficiently large, together with the upward force of spring 40, the central valve member 33 will move upwardly a sufficient distance to seat the lower ball of the pilot plug 42 to close the exhaust passage and unseat the valve member 38 from the upper ball of pilot plug 42 to thereby allow pressurized gas to pass through the spacer-connector 36 and valve member 38 to the line 16 to again pressurize the pump 14. Simultaneously, the pressurized gas passes through port 46 that extends upwardly through lower body 26, flange 24 and upper body 22 to a chamber 48 above diaphragm 28 which has an exposed area larger than the exposed area of middle diaphragm 30 and, therefore, as the pressure increases in chamber 48 to approach the pressure between middle diaphragm 30, the central valve member 33 is urged downwardly by diaphragm 28. This causes engagement of the valve member 38 with the upper ball of pilot plug 42 to stop the flow of pressurized gas from source 12 to the pump 14 and the downward movement of pilot plug 42 caused by the central valve member 33 causes the lower ball of pilot plug 42 to be moved from its valve seat and open the exhaust port 18 for exhausting the pressurized gas to complete the pumping cycle.

The adjustment knob 20 is connected to a needle valve 20a which serves to adjust the size of the opening from port 46 to chamber 48 and, therefore, control the speed with which chamber 48 is filled with the pressurized gas and the gas is exhausted through port 46, as described above. In turn, this controls the rate at which the central valve member 33 oscillates and the rate at which the pump 14 operates. It should be noted that the port 46 may be advantageously positioned at a different circumferential location in the controller 10 rather than in the same plane as the connections to the gas pressure source 12 and line 16, but port 46 is shown in that plane in FIG. 2 only for convenience of illustration. Also, it should be noted that a vent 50 is provided in flange 24 from the space between upper diaphragm 28 and middle diaphragm 30 to prevent a build-up of pressure between those two diaphragms which could cause the central valve member 33 to lock in the upper position.

The controller 10 will operate within a design pressure range that is selected on the basis of the expected pressure range of the gas pressure source 12 since, in many installations, the actual pressure of the source 12 varies. The pressure range within which a controller 10 of a specific size will operate can be determined by the selection of the spring 44 that engages the lower ball of the pilot plug 42. Specifically, a light spring will allow operation at a relatively low pressure range such as 20–50 psi and a heavier spring 44 will allow operation of the controller at a higher range, such as 30–100 psi. For a specific installation, the spring 44 may be conveniently removed and replaced by merely removing and replacing the plug 52 in the bottom of lower body 26 without disassembling the controller 10 or disconnecting it from source 12 or line 16, as in prior commercial embodiments.

Before the oscillating operation of the controller 10 is started or after a period of operation when the pressure from gas pressure source 12 drops below a predetermined amount, such as 20 lbs. for the light spring 44 or 30 lbs. for the heavy spring 44 described in the preceding paragraph, the relative pressures in the various chambers in the controller may reach a condition that precludes the central valve member 33 from oscillating, even if the pressure from gas pressure source 12 is subsequently increased to an adequate level in a slow manner. Specifically, the central valve member 33 will remain in an intermediate position upwardly from the position shown in FIG. 2 and the increased gas pressure will not cause either the upper ball or the lower ball of the pilot plug 42 to be released from its valve seat whereby the controller reaches balanced, inoperative condition that does not occur during oscillating operation if the pressure from source 12 remains sufficiently high. The embodiments of this invention that overcome this difficulty will now be described.

Referring now to FIGS. 3A, 3B and 3C, a restart valve 60 is shown in detail. The restart valve 60 is threadedly connected between the gas pressure source 12 and the inlet port in the lower body 26 of the controller illustrated in FIG. 2. A passage 61 is formed in valve body 62 of restart valve 60 for communicating the gas from gas pressure source 12 through the restart valve 60 to the controller 10, as shown by arrows A1 and A2 in FIG. 3B when the valve is open. Valve body 62 includes a valve seat 63 which may be provided with an O-ring 64 to be engaged by a valve element 65 to close the restart valve 60 as shown in FIG. 3A. The valve element 65 includes a valve stem 66 connected to a flange that engages a piston or diaphragm 67 mounted in a cavity in valve body 62 that is closed by plug 68. A compression coil spring 69 serving as a valve spring is positioned in valve body 62 to encircle and urge the valve stem 66 upward to close the valve element 65 against the valve seat 63 and O-ring 64. A port 70 on the upstream side of the valve body 62 connects the gas pressure source 12 to the cavity above the diaphragm 67, as shown by arrow A3, to cause the diaphragm 67 to force the valve stem 66 downwardly in opposition to the valve spring 69 and maintain the valve element in the open position when the gas pressure on diaphragm 67 is adequate. Further, as shown in FIG. 3C, a detent mechanism 72 is provided for assisting in maintaining the valve element 65 in the open position. Detent mechanism 72 may include a pair of annular grooves 73 and 74 in the valve stem 66 adapted to be engaged by a pair of balls 75 on opposite sides of the valve stem 66 which are separately urged by a pair of compression coil springs 76. The magnitude of holding force by the balls 75 in the grooves 73 and 74 is determined by the coil springs 76 and may be adjusted by a screw 77 which engages each coil spring 76.

The operation of the restart valve 60 of FIGS. 3A, 3B, and 3C will now be described. As noted above, when the pressure from gas pressure source 12 remains adequate while the controller 10 is operating, the pressure supplied through port 70 to diaphragm 67 as shown by arrow A3 maintains the valve element 65 in the open position with the balls 75 of detent mechanism 72 positioned in annular groove 73. If the pressure from source 12 drops below a predetermined magnitude that might cause the controller 10 to stop operating, the pressure supplied through port 70 to diaphragm 67 becomes inadequate to oppose the valve closing force of compression valve spring 69 and, therefore, the valve element 65 moves to the closed position shown in FIG. 3A and the balls 75 of detent mechanism 72 engage the annular groove 74 in valve stem 66. As the pressure from gas pressure source 12 increases, the force applied by diaphragm 67 on valve stem 66 increases until the opposing force of valve spring 69, the size of diaphragm 67, and the position maintaining force of detent mechanism 72 is overcome, whereupon the valve element 65 moves to the open position shown in FIGS. 3B and 3C with the balls 75 of detent mechanism 72 engaging the annular groove 73 in valve stem 66. The biasing force of spring 69 and the position-maintaining force of detent mechanism 72 are properly selected to cause the restart valve 60 to close when the gas pressure source 12 drops below a first predetermined pressure at which the controller may not continue to operate and to open the restart valve 60 only when a second predetermined pressure higher than the first predetermined pressure is reached. In other words, there is an established pressure differential or hysteresis between the closing and opening pressures to which the restart valve 60 responds. Specifically, for the above described example of a controller designed to operate in a range of pressures of 20–50 psi, the elements of restart valve 60 would be selected and adjusted to cause the valve to close when the pressure drops below 20 psi and to open only if the pressure from source 12 again exceeds about 25 or 30 psi, i.e. about a 5 to 10 psi differential. When the restart valve 60 opens after being closed by a low gas pressure, the sudden application of a higher than minimum gas pressure causes the oscillating operation of the controller 10 to resume. Similarly, when first installing a controller 10, the gas pressure supplied thereto will not be slowly increased from zero but rather the restart valve 60 will not open until a higher than minimum gas pressure is reached. Thus, the problem of starting or restarting the oscillating operation of a conventional controller 10 is solved by the start/restart valve 60 of the present invention and the controller can be in a remote location without requiring constant or periodic monitoring since the start/restart valve 60 will automatically restart the controller 10 after the occurrence of an excessively low operating gas pressure.

Referring now to FIGS. 4A, 4B and 5, a second embodiment of the present invention is illustrated as start/restart valve 60a which is substantially similar to start/restart valve 60 and therefore the same or similar elements will be identified by the same numeral with an "a" suffix. A passage 61a is provided through the valve body 62a for the passage of gas from gas pressure source 12 to the controller 10. A valve element 65a has a valve stem 66a extending longitudinally through the valve body 62a within the passage 61a. The valve element 65a engages an O-ring 64a for closing the valve, as shown in FIG. 4A, and the valve element 65a moves longitudinally to an open position as shown in FIG. 4B. A detent mechanism 72a is provided in restart valve 60a and is substantially the same as detent mechanism 72 of the first embodiment. Specifically, a pair of balls 75a are urged into the grooves 73a and 74a in valve stem 66a by springs 76a in the closed and open positions, respectively, of the valve element 65a. A compression valve spring 69a encircles the valve stem 66a and urges the valve element 65a toward the closed position shown in FIG. 4A. A nut 78 is threadedly connected to the end of valve stem 66a for adjusting the compression force of valve spring 69a and, in turn, the closing force on the valve element 65a. A plurality of holes 79 are provided in nut 78 for engagement by prongs 80 of a tool 81 for accomplishing the adjustment of the spring force provided by valve spring 69a. Restart valve 60a moves from the open position shown in FIG. 4B to the closed position shown in FIG. 4A when the pressure from source 12 drops below a predetermined minimum operating pressure by the force of the valve spring 69a overcoming the position-maintaining force of detent mechanism 72a engaging groove 74a in the valve stem 66a. After the restart valve 66a is closed and the pressure from source 12 increases, that increasing pressure is applied to the valve element 65a and causes the valve element to overcome the biasing force of spring 69a and the position maintaining force of detent mechanism 72a to snap from the closed position shown in FIG. 4A to the open position shown in FIG. 4B. Thus, the restart valve 60a of this second embodiment accomplishes the same objectives as the restart valve 60 of the first embodiment.

Figure 6:
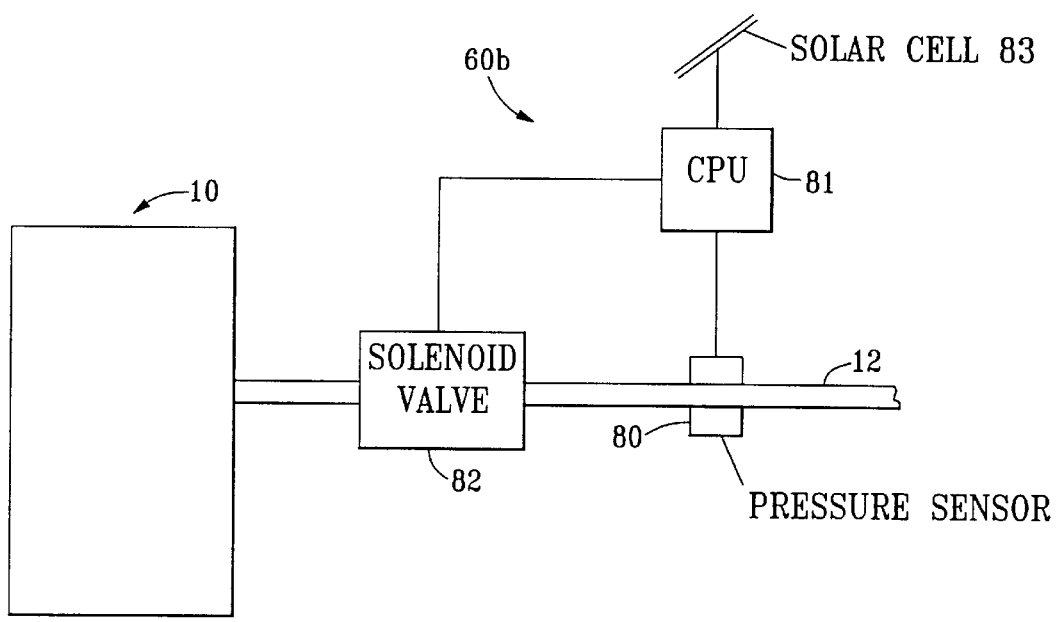
FIG. 6 is a diagrammatic view of a third embodiment of the present invention.

Referring now to FIG. 6 which shows a third embodiment of the present invention, the controller 10 is diagrammatically shown and the start/restart valve system 60b is comprised of different elements than the first and second embodiments for accomplishing the same purpose in an equivalent manner. A pressure sensor 80 is provided in communication with the gas pressure source 12 for continually monitoring the pressure being provided from source 12. A central processing unit (CPU) 81 receives the pressure signal from pressure sensor 80 and controls the open and closed positions of a solenoid valve 82 positioned in the line between the gas pressure source 12 and the controller 10. When the pressure in gas pressure source 12 drops below a first predetermined pressure, which is the minimum pressure at which the controller 10 reliably operates, the CPU 81 closes solenoid valve 82 in response to the low pressure detectd by sensor 80 to stop the supply of pressurized gas to the controller 10. When the pressure sensed by pressure sensor 80 exceeds a second predetermined pressure, which is higher than the minimum pressure for reliably operating the controller 10, the CPU 81 causes the solenoid valve 82 to open. Thus, the restart valve system 60*b* of the third embodiment operates to start and restart the controller 10 in substantially the same manner as restart valves 60 and 60*a*. The restart valve system 60*b* may be provided with a solar cell 83 and a battery (not shown) for providing electrical energy to operate the pressure sensor 80, CPU 81 and solenoid valve 82 in a remote location that does not have a continuous electricity source.

While this invention has been described in connection with three specific embodiments of the restart valve of this invention, as illustrated in the drawings, it is to be understood that the invention is not limited to those specific embodiments but rather is of the full scope of the appended claims.

What is claimed:

1. A start/restart valve for starting or restarting the oscillating of a gas pressure operated oscillating controller for fluid pumps, comprising, a valve body for connecting between the controller and a gas pressure source for operating the controller, a passage in the valve body for communicating the gas pressure source to the controller, a valve element mounted in said valve body and movable between an open position allowing gas flow through said passage and a closed position with said valve element engaging a valve seat in said valve body for preventing gas flow through said passage, and valve actuating means operatively connected to said valve element and in communication with the gas pressure source for causing said valve element to move to said closed position when a pressure of the gas pressure source drops below a first predetermined pressure and for causing said valve element to move automatically from said closed position to said open position when the pressure of the gas pressure source exceeds a second predetermined pressure higher than said first predetermined pressure.

2. The start/restart valve of claim 1, wherein said valve actuating means includes means engaging said valve element for maintaining said valve element in said open position until the gas pressure drops below said first predetermined pressure and in said closed position until the gas pressure exceeds said second predetermined pressure.

3. The start/restart valve of claim 1, wherein said valve actuating means includes a detent mechanism mounted in said valve body and engaging a valve stem of said valve element for selectively maintaining said valve element in the open position and the closed position.

4. The start/restart valve of claim 3, wherein said detent mechanism includes a pair of annular grooves in said valve stem, a ball movably mounted in said valve body at a location for engaging said pair of annular grooves and a spring mounted in said valve body and engaging said ball for resiliently urging said ball toward said pair of annular grooves.

5. The start/restart valve of claim 4, wherein a plurality of said balls and said ball engaging springs are provided in said valve body.

6. The start/restart valve of claim 4, wherein means are provided for adjusting the magnitude of said resilient urging of said ball that is imposed by said spring.

7. The start/restart valve of claim 3, wherein said valve stem extends laterally of said passage in said valve body.

8. The start/restart valve of claim 7, wherein said valve actuating mechanism includes a chamber in said valve body at an end of said valve stem, a diaphragm mounted in said chamber and engaging said valve stem, and a port in said valve body communicating said chamber with the gas pressure source for causing said diaphragm to move said valve element to the open position when said gas pressure exceeds said second predetermined pressure.

9. The start/restart valve of claim 8, wherein a valve spring is mounted in said valve body and engages and urges said valve element toward the closed position.

10. The start/restart valve of claim 7, wherein a valve spring is mounted in said valve body and engages and urges said valve element toward the closed position.

11. The start/restart valve of claim 1, wherein said valve stem extends longitudinally of said passage in said valve body.

12. The start/restart valve of claim 11, wherein a valve spring is mounted in said valve body and engages and urges said valve element toward the closed position.

13. The start/restart valve of claim 1, wherein said valve actuating means includes a pressure sensor in communication with and sensing the pressure of the gas pressure source for producing an electrical signal corresponding to the sensed pressure, and means operably connected to said pressure sensor and said valve element for causing said movement of said valve element between the open position and the closed position in response to said electrical signal from said pressure sensor.

14. The start/restart valve of claim 1, wherein said first predetermined pressure is a pressure below which the oscillating controller stops oscillating.

15. The start/restart valve of claim 14, wherein said second predetermined pressure is at least about five psi greater than said first predetermined pressure.

16. A start/restart valve for starting and restarting the oscillation cycles of a gas pressure operated oscillating controller for fluid pumps, comprising, a valve body for connecting between the controller and a gas pressure source for operating the controller, a passage in the valve body for communicating the gas pressure source to the controller, a valve element slidably mounted in said valve body and movable between an open position allowing gas flow through said passage and a closed position with said valve element engaging a valve seat in said valve body for preventing gas flow through said passage, said valve element having a valve stem with a pair of annular grooves, a ball movably mounted in said valve body at a location for engaging said pair of annular grooves, a spring mounted in said valve body and engaging said ball for resiliently urging said ball toward said valve stem and into said pair of annular grooves, a valve spring mounted in said valve body for engaging and urging said valve element toward the closed position, means for applying the pressure of the gas pressure source to said valve element for urging said valve element toward the open position, and said valve spring and said ball engaging said annular grooves cooperating for allowing said valve element to move automatically to said closed position solely in response to the gas pressure when the pressure of the gas pressure source drops below a first predetermined pressure and for causing said valve element to move automatically to said open position solely in response to the gas pressure when the pressure of the gas pressure source exceeds a second predetermined pressure higher than said first predetermined pressure.

17. A start/restart valve for starting or restarting the oscillating of a gas pressure operated oscillating controller for fluid pumps, comprising, a valve body for connecting between the controller and a gas pressure source for operating the controller, a passage in the valve body for communicating the gas pressure source to the controller, a valve element mounted in said valve body and movable between an open position for allowing gas flow through said passage and a closed position for preventing gas flow through said passage, a valve spring urging said valve element toward the closed position, and said valve element having means in continual communication with the gas pressure source for urging said valve element toward the open position in direct response to a pressure of the gas pressure source for allowing said valve spring to cause said valve element to move to said closed position when the pressure of the gas pressure source drops below a first predetermined pressure and for said valve element means to cause said valve element to move from the closed position to said open position when the pressure of the gas pressure source exceeds a second predetermined pressure higher than said first predetermined pressure.

18. The start/restart valve of claim 17, wherein mechanical means are provided for engaging said valve element and positively maintaining said valve element in said open position until the gas pressure drops below said first predetermined pressure and in said closed position until the gas pressure exceeds said second predetermined pressure.

19. The start/restart valve of claim 17, wherein a chamber is provided in said valve body, a diaphragm is mounted in said chamber and engages a valve stem of said valve element, and a port in said valve body communicates said chamber with the gas pressure source for causing said diaphragm to move said valve stem and valve element to the open position when said gas pressure exceeds said second predetermined pressure.

\* \* \* \* \*